S. L. BATEMAN.
SIEVE.
APPLICATION FILED MAR. 15, 1920.
1,347,489.
Patented July 27, 1920.
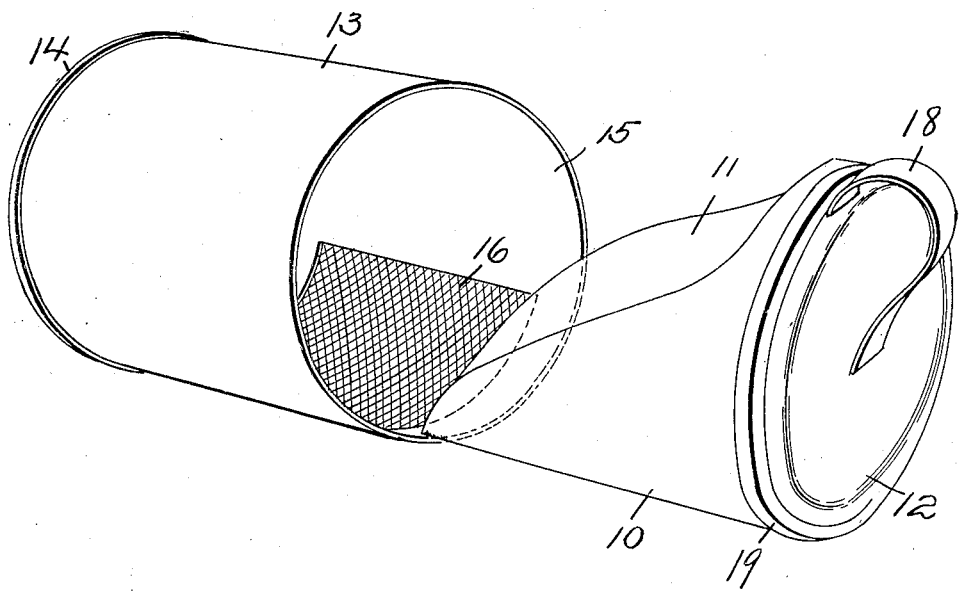
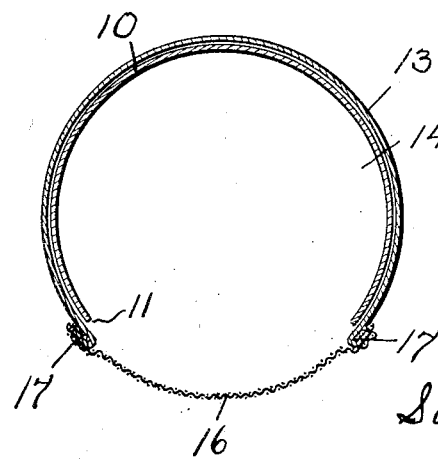
INVENTORS
Samuel L. Bateman,
BY
Wm H. Caufield.
ATTORNEY

UNITED STATES PATENT OFFICE.

SAMUEL L. BATEMAN, OF NEWARK, NEW JERSEY, ASSIGNOR OF ONE-HALF TO GEORGE A. LOBSITZ, OF NEWARK, NEW JERSEY.

SIEVE.

1,347,489.  Specification of Letters Patent.  Patented July 27, 1920.

Application filed March 15, 1920. Serial No. 365,819.

*To all whom it may concern:*

Be it known that I, SAMUEL L. BATEMAN, a citizen of the United States and a resident of Newark, county of Essex, and State of New Jersey, have invented certain new and useful Improvements in Sieves, of which the following is a specification.

This invention relates to an improved sieve which is adapted to be used by hand, being of the portable type, and is particularly adapted for use as a flour sieve.

The invention is designed to provide a sieve in which two members are employed, one of them being a scoop by means of which the flour is taken from the receptacle in which it is kept, and a member which can be slid over the sieve, and then when the scoop is turned around once or twice within this second or sieve member, the flour has been sifted, the scoop can be withdrawn to be replenished, and the sieve member, which is preferably of open-ended cylindrical form, can be cleaned by simply tapping it with its open end downward, whereby all material that has not passed through the sieve is ejected.

The invention is illustrated in the accompanying drawing, in which Figure 1 is a perspective view of the sieve with its two members separated, and Fig. 2 is a cross-section of the device with the two members assembled.

The sieve consists of two members, one of them, the scoop member 10, being made in the form of a cylinder with the forward end and one side of the scoop being open, as at 11, and it has a closed end 12. The sieve member 13, in the form of a cylinder, has a closed end 14 and an open end 15. Part of the side wall, usually about one-fourth of the circumference, is cut away and is provided with a sieve 16, usually made of fine mesh wire and held in place by any suitable means, in the form shown the sieve being held by the folded over flanges 17, which hold the side edges of the sieve.

The ends of the sieve can be soldered or otherwise secured to the member 13, if desired, the sieve 16 preferably terminating short of the ends of the cylinder so as to give a strengthening rib for the side walls and either end, and thus form a more stable support for the ends of the sieve.

The members are freely assembled and separated, being a comparatively loose fit, so that when the scoop is filled with flour the sieve member can be easily slid over it, and then the scoop is turned, being usually provided with a handle 18 or similar projection by means of which the scoop can be rotated within the sieve member.

To prevent flour coming out the open end of the cylinder when the scoop is in place, and since the members have a rather loose fit, I provide a flange or folded part 19 on the margin of the closed end 12, the part 19 being of a diameter sufficient to bear against the edge of the open end of the sieve member and form a tight closure. This insures all the flour passing out through the sieve 16 and not leaking out of the end of the sieve member, even if it is slightly tilted, as all that it is necessary to do is to hold the members together with a slight pressure and turn the scoop inside of the cylinder.

It will be evident that slight modifications can be made in the shape and disposition of the parts without departing from the scope of my invention.

This cylinder can be pressed or drawn of one piece with perforations to form a sieve, as well as having fine mesh wire, thus making the cylinder sieve member in one piece.

I claim:

1. A sieve comprising a scoop member with an open side, and a cylindrical sieve member with a closed end and an open end and having a sieve in its side wall, the members telescoping longitudinally and being freely separable.

2. A sieve comprising a scoop member with an open side, a cylindrical sieve member with a closed end and an open end and having a sieve in its side wall, the members telescoping longitudinally and being freely separable, and a handle on the closed end of the scoop, whereby the scoop can be rotated inside the sieve member.

3. A sieve comprising a scoop member with an open side, and a cylindrical sieve member with a closed end and an open end and having a sieve in its side wall, the members telescoping longitudinally and being freely separable, the outer end of the scoop having a marginal flange to fit against the open end of the sieve member for forming a closed joint when the members are assembled.

In testimony that I claim the foregoing, I have hereto set my hand, this 11th day of March, 1920.

SAMUEL L. BATEMAN.